United States Patent
Dinerstein et al.

(10) Patent No.: US 9,838,660 B1
(45) Date of Patent: Dec. 5, 2017

(54) METHODS AND SYSTEMS FOR WHITE BALANCE

(71) Applicant: Samsung Electronics Co., Ltd., Suwon-si, Gyeonggi-do (KR)

(72) Inventors: Michael Dinerstein, Ramat Gan (IL); Ohad Givaty, Ramat Gan (IL)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 15/236,920

(22) Filed: Aug. 15, 2016

(51) Int. Cl.
*H04N 9/73* (2006.01)
*G06T 7/40* (2017.01)

(52) U.S. Cl.
CPC ............... *H04N 9/73* (2013.01); *G06T 7/408* (2013.01); *G06T 2207/10024* (2013.01)

(58) Field of Classification Search
CPC .. H04N 9/73; G06T 7/408; G06T 2207/10024
See application file for complete search history.

(56) References Cited

U.S. PATENT DOCUMENTS

| | | | |
|---|---|---|---|
| 6,421,462 B1 * | 7/2002 | Christian | G06K 9/00369 345/2.2 |
| 7,570,808 B2 * | 8/2009 | Wu | H04N 5/3572 345/20 |
| 8,629,913 B2 * | 1/2014 | Cote | H04N 5/335 348/222.1 |

OTHER PUBLICATIONS

Hordley, S.D., "Scene Illuminant Estimation: past, present, and future," Color Research & Application <http://www.researchgate.net/journal/1520-6378_Color_Research_Application> Jul. 2006; 31(4):303-314.

Dempster, A.P. et al., "Maximum Likelihood from Incomplete Data via the $Em$ Alogithm," Journal of the Royal Statistical Society, vol. 39, No. 1, pp. 1-38, 1977.

* cited by examiner

*Primary Examiner* — Tuan Ho
(74) *Attorney, Agent, or Firm* — Harness, Dickey & Pierce, P.L.C.

(57) ABSTRACT

At least one example embodiment provides an apparatus including a processor configured to execute computer-readable instructions to receive image data from a plurality of pixels, determine a first white point based on the image data and a threshold percentage of a histogram of the image data, determine a second white point based on the image data, determine a third white point based on groups of the image data corresponding to a same hue or desaturation, the processor configured to divide the image data into the groups and determine an image based on at least the first white point, the second white point and the third white point.

20 Claims, 9 Drawing Sheets

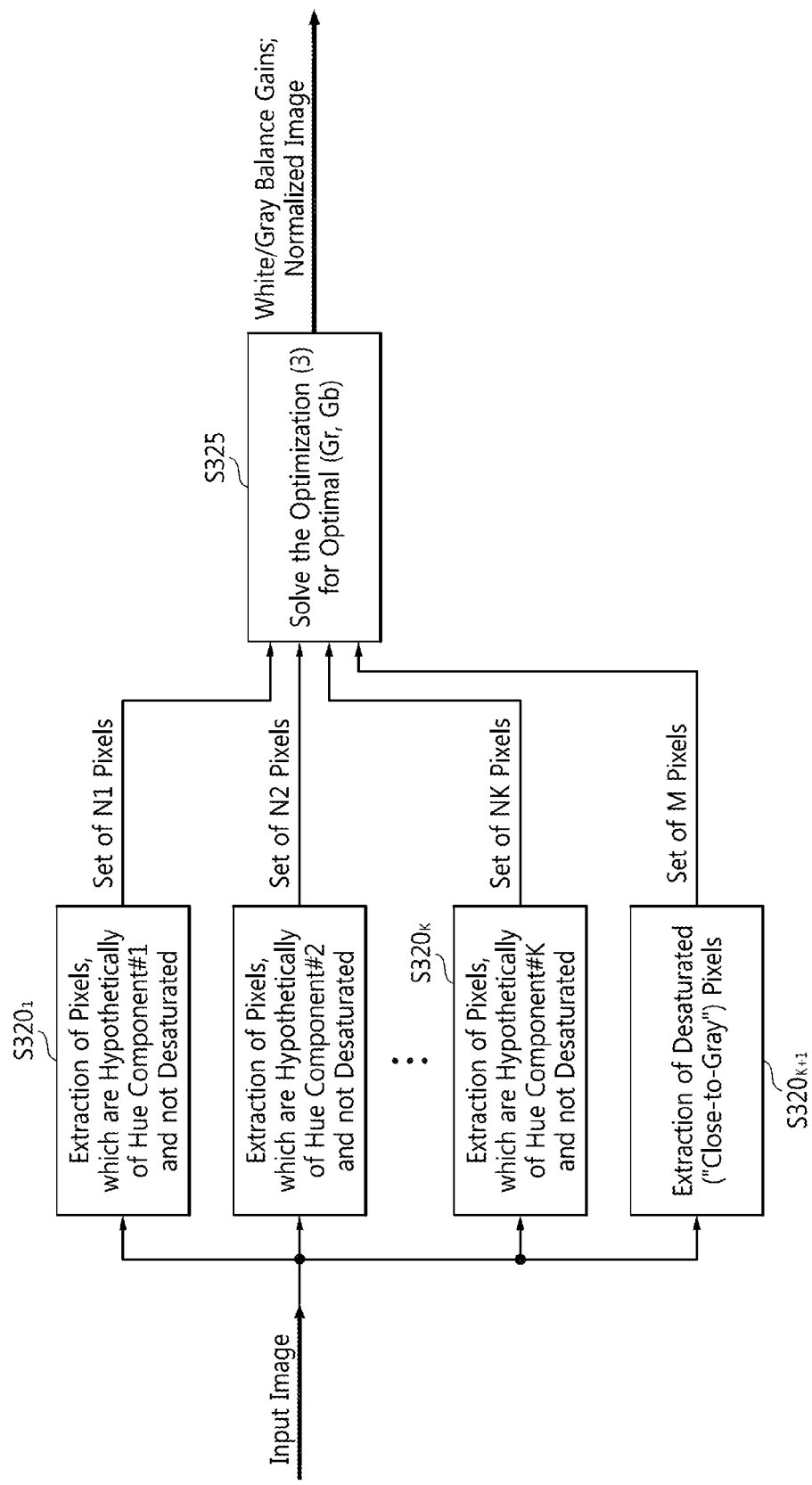

METHODS AND SYSTEMS FOR WHITE BALANCE

BACKGROUND

In general, automatic white balancing refers to an imaging technique of reproducing a white object as a white image according to a light source illuminating the white object, such as sunlight, a fluorescent lamp, an incandescent room lamp, or the like.

Since human beings are adapted to colors, they can properly distinguish color differences of an object depending on the change in the lighting and location. However, since cameras are not adapted to colors, color differences of an object are reproduced according to the lighting and location. Accordingly, in order to control a phenomenon that changes colors of an object according to light sources of a camera, an automatic white balance technique is employed.

In an automatic white balance technique, areas of an input image are searched and gains of various channels are adjusted using an average of red, green and blue (RGB) values or chrominance signals (R-Y (luma)), (B-Y) of image data corresponding to the searched gray areas.

SUMMARY

At least some example embodiments use properties of natural images for automatic white/gray balance gains computation, or, alternatively, for estimation of illuminant properties. The properties of natural images include: (i) natural images are images of objects; (ii) object surfaces often consist of homogenous materials, and have homogeneous reflection properties. "Homogenous reflection properties" means that in an image, pixels, corresponding to such surfaces have a similar hue, if an illuminant is perfectly white/gray. This property is referred to as "Hue Constancy." Additional properties of natural images include (iii) if an illuminant is not white/gray, these pixels will not be of the same hue anymore.

According to an example embodiment, in a first stage, pixels may be sub-divided into groups according to hue. Next, the white balance gains as well as other parameters are estimated, which enables to perform a new sub-division of the pixels.

At least one example embodiment discloses an apparatus including a processor configured to execute computer-readable instructions to receive image data from a plurality of pixels, determine a first white point based on the image data and a threshold percentage of a histogram of the image data, determine a second white point based on the image data, determine a third white point based on groups of the image data corresponding to a same hue or desaturation, the processor configured to divide the image data into the groups and generate an image based on at least the first white point, the second white point and the third white point.

At least another example embodiment discloses a method including receiving image data from a plurality of pixels, determining a first white point based on the image data and a threshold percentage of a histogram of the image data, determining a second white point based on the image data, determining a third white point based on groups of image data corresponding to a same hue or desaturation, the processor configured to divide the image data into the groups and generating an image based on at least the first white point, the second white point and the third white point.

BRIEF DESCRIPTION OF THE DRAWINGS

Example embodiments will become more appreciable through the description of the drawings in which:

FIG. 3C illustrates another method of determining white balancing gains, taking into account pixels that have a saturation of zero or close to zero, according to an example embodiment.

DETAILED DESCRIPTION

Figure 1:
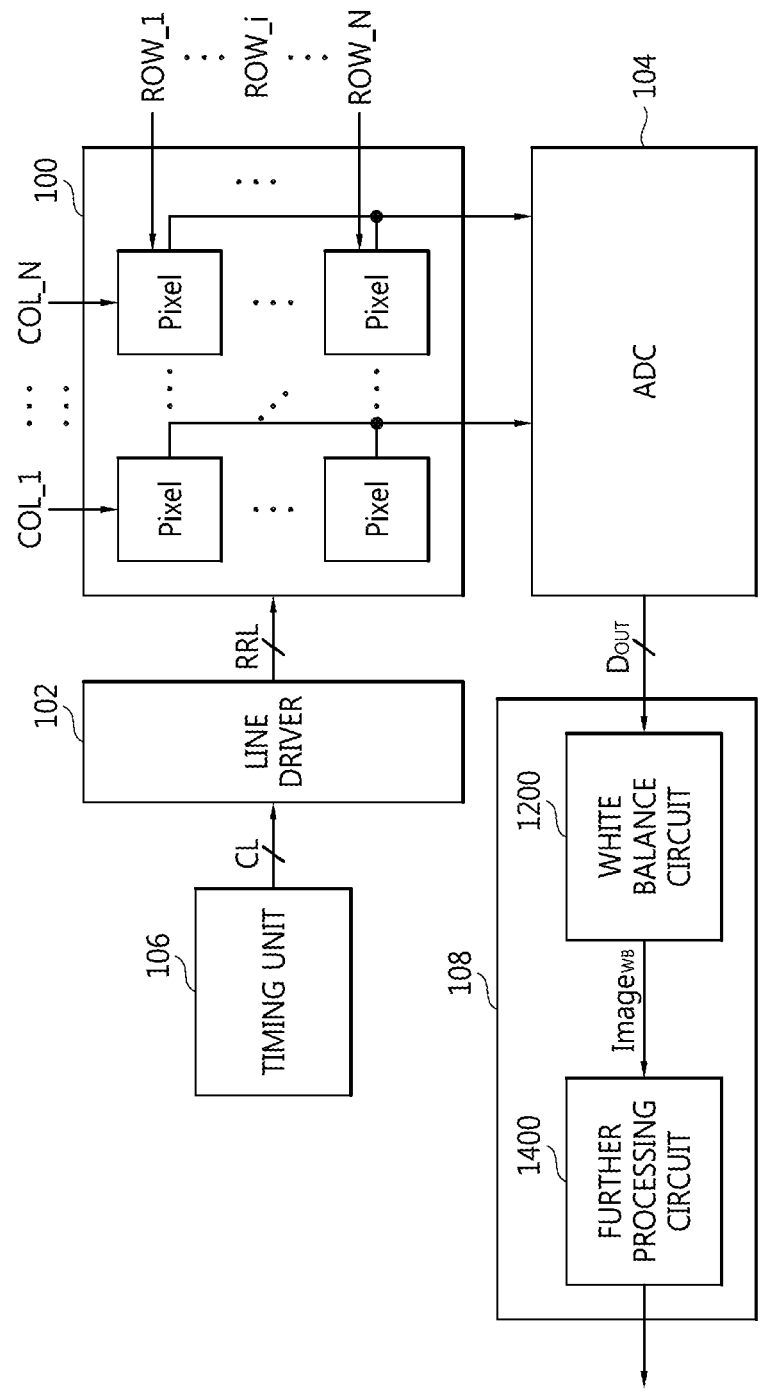
FIG. 1 is a block diagram illustrating an example embodiment of an image sensor.

Example embodiments will now be described more fully with reference to the accompanying drawings. Many alternate forms may be embodied and example embodiments should not be construed as limited to example embodiments set forth herein. In the drawings, like reference numerals refer to like elements.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., digital single lens reflex (DSLR) cameras, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits, field programmable gate arrays (FPGAs) computers or the like.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

As a result, example embodiments provide methods and systems for white balancing.

FIG. 1 is a block diagram of an image sensor 1000 according to an example embodiment. In the example shown in FIG. 1, the image sensor 1000 is a complementary-metal-oxide-semiconductor (CMOS) image sensor. The image sensor 1000 may be embodied in a portable electronic device such as a digital camera, a mobile phone, a smart phone, a tablet personal computer (PC), a personal digital assistant (PDA), a mobile internet device (MID), or a wearable computer or another electronic device (e.g., laptop computer, etc.) including, associated with or connected to a camera. However, example embodiments should not be limited to this example.

Referring to FIG. 1, a timing circuit 106 controls a line driver 102 through one or more control lines CL. In one example, the timing circuit 106 causes the line driver 102 to generate a plurality of transfer pulses (e.g., reset/shutter, sampling, readout, and/or selection). The line driver 102 outputs the transfer pulses to a pixel array 100 over a plurality of read and reset lines RRL. The read and reset lines RRL may include transfer lines, sampling lines, reset lines, and selection lines.

The pixel array 100 includes a plurality of pixels arranged in an array of rows ROW_0, ..., ROW_i, ..., ROW_N−1 and columns COL_0, ..., COL_i, ..., COL_N−1. As discussed herein, rows and columns may be collectively referred to as lines. Each of the plurality of read and reset lines RRL corresponds to a line of pixels in the pixel array 100 having a Bayer color pattern. In the example embodiment shown in FIG. 1, each pixel is an active-pixel sensor (APS), and the pixel array 100 is an APS array.

As is known, in the Bayer color pattern, 'R' represents a pixel for sensing read color light, and 'B' represents a pixel for sensing blue color light. 'G' represents a pixel for sensing green color light.

Still referring to FIG. 1, the analog-to-digital converter (ADC) 104 converts the output pixel data (e.g., voltages) from the i-th line ROW_i of readout pixels into a digital signal (also referred to herein as image data). The ADC 104 then outputs the image data $D_{OUT}$ to an image processing circuit 108. The image processing circuit 108 performs further processing so as to generate an image to be displayed on a display device (e.g., monitor, etc.) and/or stored in a memory (not shown).

As shown, the image processing circuit 108 includes a white balancing circuit 1200 and further image processing circuits 1400. The white balance circuit generates a white balanced image $Image_{WB}$ and outputs it to the further image processing circuits 1400 such as a color inconsistency information extraction circuit.

The white balancing circuit 1200 and the further image processing circuits 1400 and/or any components thereof may be hardware, firmware, hardware executing software or any combination thereof. When the color correction circuit 1200 the further image processing circuits 1400 is hardware, such hardware may include one or more Central Processing Units (CPUs), system-on-chips (SOCs), digital signal processors (DSPs), application-specific-integrated-circuits (ASICs), field programmable gate arrays (FPGAs) computers or the like configured as special purpose machines to perform the functions of the color correction circuit 1200 or the further image processing circuits 1400. CPUs, SOCs, DSPs, ASICs and FPGAs may generally be referred to as processors and/or microprocessors.

Figure 2:
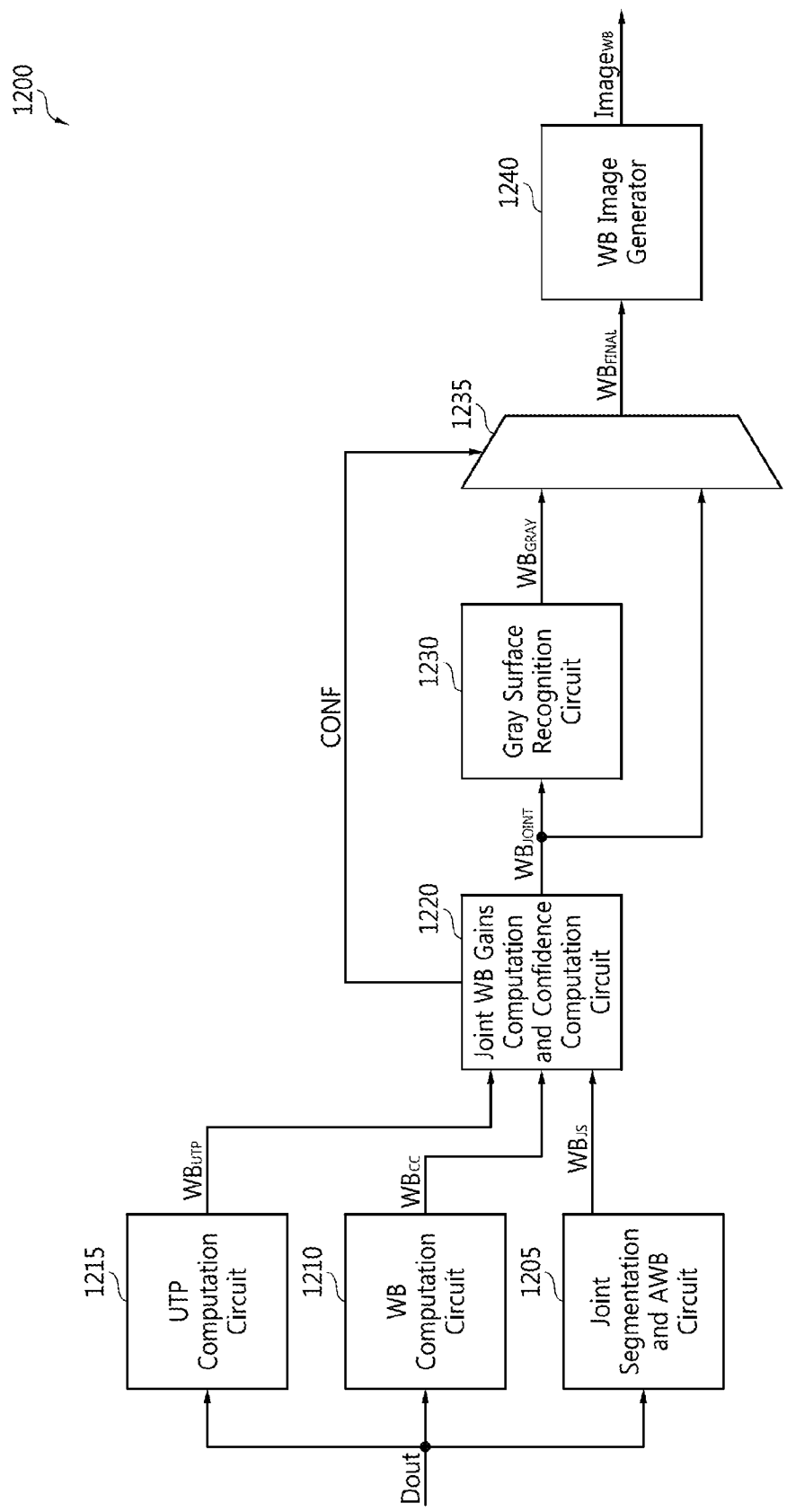
FIG. 2 illustrates a white balancing circuit of FIG. 1, according to an example embodiment.

FIG. 2 illustrates a white balancing circuit according to an example embodiment.

As shown in FIG. 2, the white balancing circuit 1200 includes an Under Threshold Percentage (UTP) computation circuit 1215, a white balance (WB) computation circuit 1210, a joint segmentation and AWB circuit 1205, a joint WB and confidence computation circuit 1220, a gray surface recognition circuit 1230, a selector 1235 and a white balance image generator 1240.

Each of the UTP computation circuit 1215, the white balance computation circuit 1210, the joint segmentation and AWB circuit 1205, the joint WB and confidence computation circuit 1220, the gray surface recognition circuit 1230, the selector 1235 and the white balance image generator 1240 may be implemented in hardware, a processor configured to execute software, firmware, or any combination thereof, for example. When at least one of the UTP computation circuit 1215, the white balance computation circuit 1210, the joint segmentation and AWB circuit 1205, the joint WB and confidence computation circuit 1220, the gray surface recognition circuit 1230, the selector 1235 and the white balance image generator 1240 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the UTP computation circuit 1215, the white balance computation circuit 1210, the joint segmentation and AWB circuit 1205, the joint WB and confidence computation circuit 1220, the gray surface recognition circuit 1230, the selector 1235 and the white balance image generator 1240. CPUs, DSPs, ASICs and FPGAs may generally be referred to as processors and/or microprocessors.

In the event where at least one of the UTP computation circuit 1215, the white balance computation circuit 1210, the joint segmentation and AWB circuit 1205, the joint WB and confidence computation circuit 1220, the gray surface recognition circuit 1230, the selector 1235 and the white balance image generator 1240 is a processor executing software, the processor is configured as a special purpose machine to execute the software, stored in a storage medium (e.g., memory 140), to perform the functions of the at least one of the UTP computation circuit 1215, the white balance computation circuit 1210, the joint segmentation and AWB circuit 1205, the joint WB and confidence computation circuit 1220, the gray surface recognition circuit 1230, the selector 1235 and the white balance image generator 1240. In such an embodiment, the processor may include one or more Central Processing Units (CPUs), digital signal processors (DSPs), application-specific-integrated-circuits (ASICs), field programmable gate arrays (FPGAs) computers.

The UTP computation circuit 1215, the white balance computation circuit 1210 and the joint segmentation and AWB circuit 1205 process the input image data $D_{OUT}$ and output data to the joint WB and confidence computation circuit 1220. More specifically, the WB computation circuit 1210 generates white balance values (e.g., normalized blue and red values) $WB_{CC}$ using any conventional method. While white balance values are referred to as normalized blue and red values, it should be understood that normalized green and red values may be used. The UTP computation circuit 1215 generates white balance values $WB_{UTP}$ based on the input image $D_{OUT}$ as will be described with respect to FIG. 6, and the joint segmentation and AWB (automatic white balancing) circuit 1205 performs white balancing in accordance with the methods described in FIGS. 3A-4 to generate the white balance values $WB_{JS}$. Each of joint segmentation and AWB circuit 1205, WB computation circuit 1210 and UTP computation circuit 1215 determines gains for red and blue channels and applies the gains to the red, green and blue white point values such that the sum of the white point values modified by the gains equals 1.

Figure 3A:
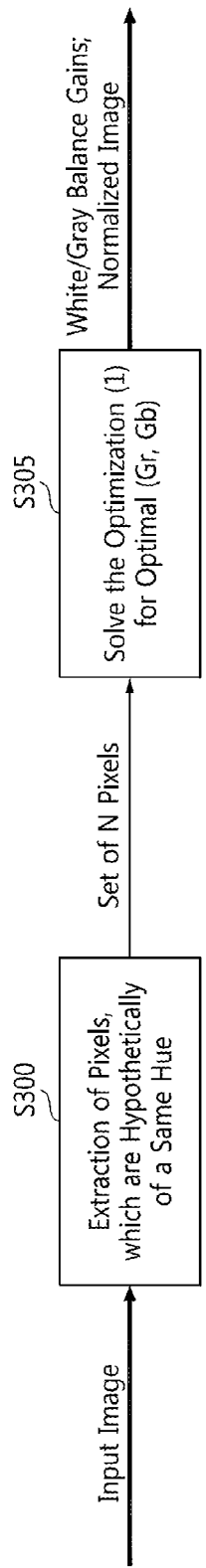
FIG. 3A illustrates a method of determining white balancing gains for a single hue, according to an example embodiment.
Figure 3B:
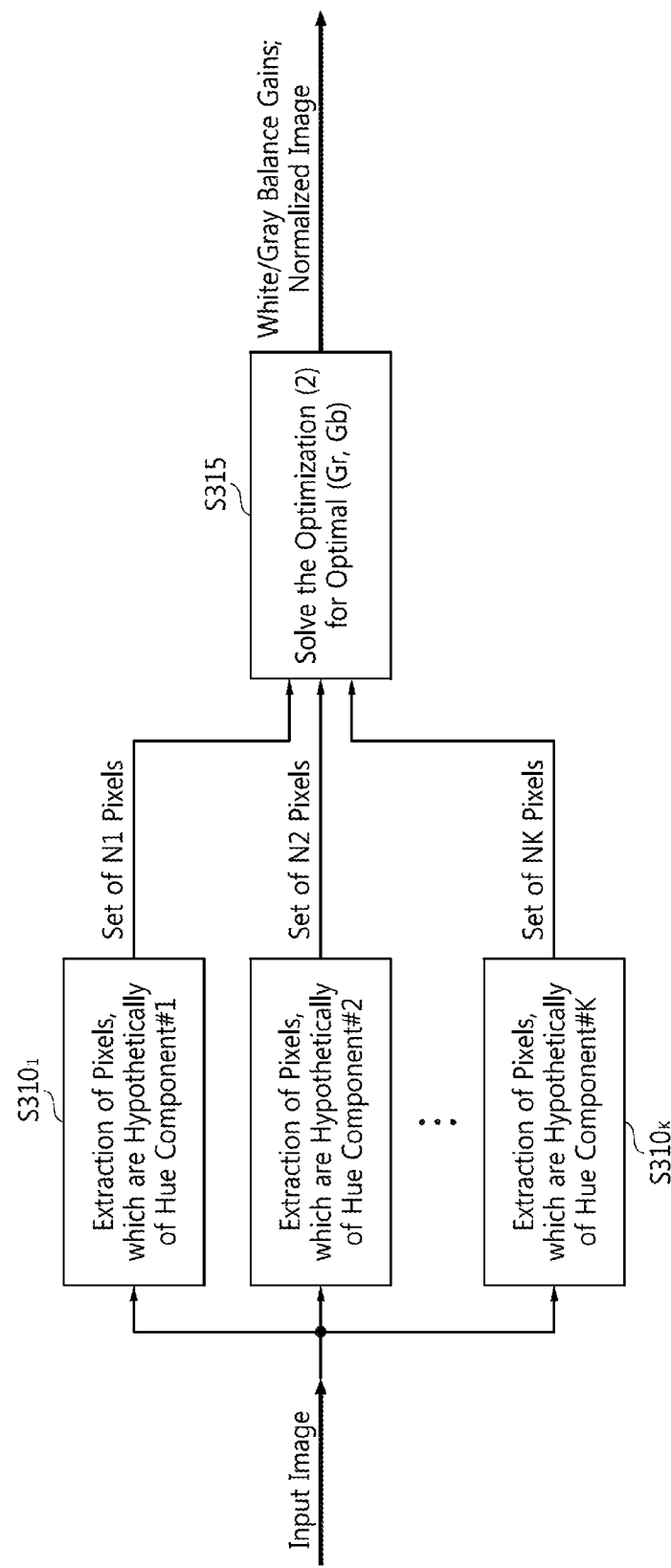
FIG. 3B illustrates a method of determining white balancing gains for multiple hues, according to an example embodiment.
Figure 4:
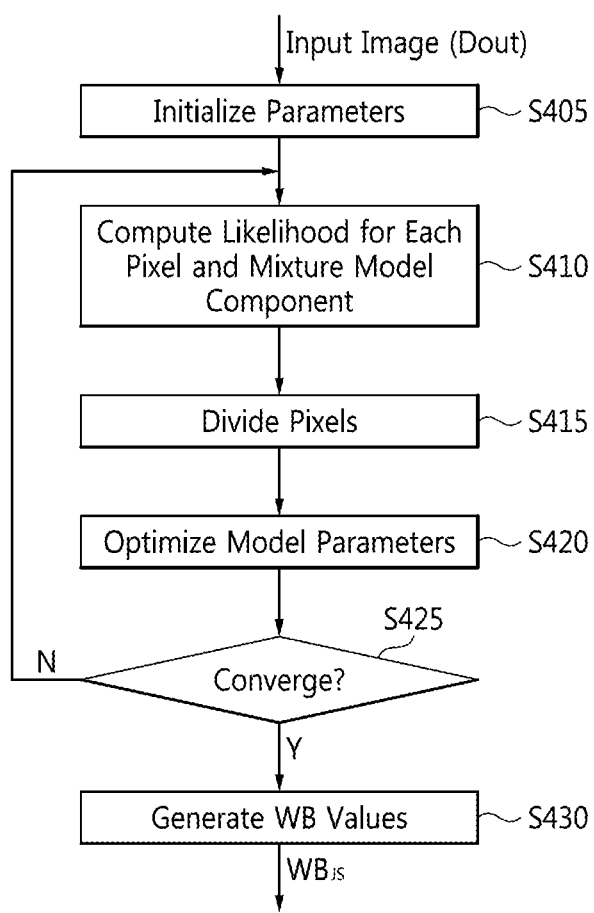
FIG. 4 illustrates an iterative method of determining gains for channels of an image based on the methods shown in FIGS. 3A-3C, according to an example embodiment.

FIGS. 3A-4 illustrate methods of determining gains for channels of an image. More specifically, FIGS. 3A-3C illustrate a general initial method for determining white/balance gains for a number of hues. FIG. 4 illustrates an iterative method of determining gains for channels of an image based on the methods shown in FIGS. 3A-3C. The methods shown in FIGS. 3A-4 are performed by the joint segmentation and AWB circuit 1205.

During image capturing, a camera obtains rays of light reflected and refracted by surfaces of scene objects. "Object" may refer to something that exists in a scene including natural and artificial objects such as buildings, cars, people, animals, etc., and amorphous objects such as sky, grass and ocean. The colors of the captured objects in the image depend on the original colors of the objects as well as illumination conditions of the scene. For example, an image of some scene in day light illumination condition will look different than the same scene during a sunset or a dawn. This difference is caused by difference in temperature of illuminants: it is colder in the middle of the day and warmer on the sunset.

Captured images are images of objects. Each object consists of a small set of materials. The surface of each object has subsets with homogeneous reflection properties. Thus, the objects have sub-surfaces of same hues, e.g., grass of the tennis court.

If an illuminant is white or gray, hues of a sky or walls in the office do not vary. However, this is not the case, if an illuminant is not white or gray. Misbalancing gains affect hues of image pixels.

The inventors have discovered white/gray balance gains may be determined based on estimating which image pixels are of a same hue.

To minimize a distortion S, the joint segmentation and AWB circuit 1205 may use the following optimization model for a single hue:

$$S(Gr, Gb, \varphi) = \sum_{j=1}^{N} (U(Gr \cdot r_j, g_j, Gb \cdot b_j) \cdot \sin(\varphi) - V(Gr \cdot r_j, g_j, Gb \cdot b_j) \cdot \cos(\varphi))^2 \to \min \quad (1)$$

where $Gr, Gb, \varphi$ are gains for red and blue channels and the single hue, respectively, $U(r_j, g_j, b_j)$ and $V(r_j, g_j, b_j)$ are linear functions of a j-th image pixel for computing the Chroma where r, g and b are red, green and blue intensity levels, respectively.

FIG. 3A illustrates a method of determining white balancing gains using equation (1) for a single hue, according to an example embodiment. At S300, the joint segmentation and AWB circuit 1205 extracts pixels which hypothetically belong to a single hue component. The pixels are not necessarily of the same exact hue value, since there may be some noise. In addition, the assessment of the pixel belonging to the component does not have to be 100% correct, some pixels may be totally unrelated with a hue component of the pixel majority. The joint segmentation and AWB circuit 1205 extracts the pixels of a same hue by performing an E-step of an expectation-maximization algorithm. Thus, the joint segmentation and AWB circuit 1205 determines a likelihood of each pixel belonging to the single hue. If the likelihood of a pixel exceeds a threshold value, the pixel is determined to be part of a set of N pixels belonging to the same single hue. At S305, the joint segmentation and AWB circuit 1205 performs an optimization step on the set of N pixels belonging to the same single hue. More specifically, the joint segmentation and AWB circuit 1205 performs an M-step of the expectation-maximization algorithm to maximize the likelihood of each of the N pixels belonging to the same single hue. The output generates optimized white-balance gains Gr and Gb.

Equation (1) can be modified to account for multiple object surfaces with each object surface being represented by pixels with its own hue. Thus, to minimize the distortion S, the joint segmentation and AWB circuit 1205 may use the following optimization model for K hues:

$$S(Gr, Gb, \varphi_1, \varphi_2, \ldots, \varphi_K) = \quad (2)$$

$$\sum_{k=1}^{K} \sum_{j=1}^{N_k} (U(Gr \cdot r_{j,k}, g_{j,k}, Gb \cdot b_{j,k}) \cdot \sin(\varphi_k) -$$

$$V(Gr \cdot r_{j,k}, g_{j,k}, Gb \cdot b_{j,k}) \cdot \cos(\varphi_k))^2 \to \min$$

where $(r_{j,k}, g_{j,k}, b_{j,k})$ is a j-th pixel that belongs to the k-th hue component.

FIG. 3B illustrates a method of determining white balancing gains using equation (2) for K hues. Pixels that belong to some hue component have a Chroma error (a distance between pixel representations in UV space and the UV line representing their hue component), which is modeled by a symmetric exponential distribution with the first moment equal to 0.

At S310$_1$-S310k, the joint segmentation and AWB circuit 1205 extracts pixels that are one of the K hues and groups the pixels according to the associated hue. For example, the white balancing circuit generates a set of N1 pixels having a first hue and performs the same for each of the K hues. Similar to FIG. 3A, the joint segmentation and AWB circuit 1205 extracts the pixels of a same hue by performing an E-step of an expectation-maximization algorithm. At S315, the joint segmentation and AWB circuit 1205 performs an optimization step on the sets of N1-NK pixels. The output generates optimized white-balance gains Gr and Gb.

FIG. 3C illustrates another extension of a method of determining white balancing gains, taking into account pixels that have a saturation of zero or close to zero. Pixels having a saturation of zero or close to zero means that the pixels are gray or almost gray. These pixels may affect the optimization, since they weakly constraint their corresponding angles. Thus, the method of FIG. 3C models the pixels that are gray or almost gray separately.

Equation (2) can be modified to account also for pixels that are gray or almost gray. Thus, to minimize the distortion S, the white balancing circuit may use the following optimization model for the K hues:

$$S(Gr, Gb, \varphi_1, \varphi_2, \ldots, \varphi_K) = \qquad (3)$$

$$\sum_{k=1}^{K}\sum_{j=1}^{N_k}(U(Gr \cdot r_{j,k}, g_{j,k}, Gb \cdot b_{j,k}) \cdot \sin(\varphi_k) -$$

$$V(Gr \cdot r_{j,k}, g_{j,k}, Gb \cdot b_{j,k}) \cdot \cos(\varphi_k))^2 + +$$

$$\sum_{m=1}^{M}[U(Gr \cdot r_m, g_m, Gb \cdot b_m)^2 +$$

$$V(Gr \cdot r_m, g_m, Gb \cdot b_m)^2] \to \min$$

FIG. 3C illustrates an initial method using equation (3) for K hues. As shown, at S320, the joint segmentation and AWB circuit 1205 performs K+1 extraction steps. More specifically, the joint segmentation and AWB circuit 1205 extracts pixels of a same hue for each of the K hues to generate sets of N1-NK pixels. Moreover, the joint segmentation and AWB circuit 1205 extracts pixels that are gray or "close to gray", which forms a set of M pixels.

At S325, the joint segmentation and AWB circuit 1205 performs an optimization step on the sets of N1-NK pixels and M gray pixels.

The model of equation (3) can be extended to model images which do not belong to one of the K hue components or to the close to gray pixels. Thus, to minimize the distortion S, the white balancing circuit may use the following optimization model for the K hues:

$$S(Gr, Gb, \varphi_1, \varphi_2, \ldots, \varphi_K) = \qquad (4)$$

$$\sum_{k=1}^{K}\sum_{j=1}^{N_k}(U(Gr \cdot r_{j,k}, g_{j,k}, Gb \cdot b_{j,k}) \cdot \sin(\varphi_k) -$$

$$V(Gr \cdot r_{j,k}, g_{j,k}, Gb \cdot b_{j,k}) \cdot \cos(\varphi_k))^2 + +$$

$$\sum_{m=1}^{M}[U(Gr \cdot r_m, g_m, Gb \cdot b_m)^2 + V(Gr \cdot r_m, g_m, Gb \cdot b_m)^2] +$$

$$\frac{\#(garbage pixels)}{\#pixels} \to \min$$

where $E_{m=1}{}^M[U(Gr \cdot r_m, g_m, Gb \cdot b_m)^2 + V(Gr \cdot r_m, g_m, Gb \cdot b_m)^2] \to \min$ is the model used by the joint segmentation and AWB circuit 1205 for the pixels that are gray or "close to gray".

The garbage pixel component allows the garbage pixels to have Chromas distributed uniformly. The formalization of this model component is done by counting the relative number of such pixels.

As described above with reference to FIGS. 3A-3C, image pixels are subdivided into groups, which are assumed to be of the same hues (up to noise).

FIG. 4 illustrates how the image pixels are subdivided. More specifically, FIG. 4 illustrates an iterative method. At a first stage, model parameters are initialized using default values and, for each pixel, a likelihood to belong to each of the model components is computed. Using this likelihood, the pixel division into model components is performed. Next, the model parameters are re-estimated again, and the iterative process continues in this manner until convergence.

As shown in FIG. 4, the joint segmentation and AWB circuit 1205 initializes the model parameters. The model parameters are subjects for optimization, as will be described below. The model parameters include white balance gains (white balance values) for red and blue channels (red and blue pixels) Gr and Gb, respectively, a standard deviation of the Chroma error for each hue and a standard deviation of the close to gray component. The Chroma error is a distance of pixel representations in the UV space from the UV line representing their hue component. The Chroma error is distributed according to an exponential symmetric one dimensional distribution with the first moment being zero.

In at least one example embodiment, the white balance gain for the green channel is one. However, example embodiments are not limited thereto.

As shown in FIG. 4, S410, S415, S420 and S425 is an iterative process that is performed until convergence is reached.

At S410, the joint segmentation and AWB circuit 1205 determines a likelihood for each pixel belonging to a hue. The white balance circuit 1200 performs this process for each pixel. The likelihood of a pixel with respect to some component is computed by using a formula for a likelihood computation, for example, equation (5) below, in case of the hue component, and equation (6), in case of the grey component.

For example, a Gaussian distribution of an exponential family distribution is:

$$P(p_j | Gr, Gb, \varphi_k, \sigma_k) = \qquad (5)$$

$$\frac{1}{\sqrt{2\pi}\,\sigma_k} e^{-\frac{1}{2\sigma_k^2}(U(Gr \cdot r_j, g_j, Gb \cdot b_j)\sin(\varphi)-V(Gr \cdot r_j, g_j, Gb \cdot b_j)\cos(\varphi))^2}$$

where $\sigma_k$ stands for a soft tolerance for proximity of a pixel Chroma to a line in UV space corresponding to a k-th hue component. In other words, $\sigma_k$ is a standard deviation of the chroma error. A pixel, which is far from the mean of the component in terms of that sigma, will have a very low likelihood.

For close-to-gray pixels, another Gaussian distribution is used for modeling, namely:

$$P(p_j | Gr, Gb, \sigma_{gray}) = \qquad (6)$$

$$\frac{1}{\sqrt{2\pi}\,\sigma_{gray}} e^{-\frac{1}{2\sigma_{gray}^2}(U(Gr \cdot r_j, g_j, Gb \cdot b_j)^2 + V(Gr \cdot r_j, g_j, Gb \cdot b_j)^2)}$$

where $\sigma_{gray}$ stands for a soft tolerance for proximity of a pixel Chroma to a line in UV space corresponding to a close-to-gray component.

The modeling of the "garbage" component is almost the same as was given in equation (4). The only difference is that the garbage component is multiplied by a tuning parameter $\theta_{garbage}$, which determines the amount of penalty brought by the garbage component:

$$\theta_{garbage} \frac{\#garbage\ pixels}{\#pixels}.$$

Based on the likelihoods determined at S410, the joint segmentation and AWB circuit 1205 divides the pixels among the hue, close to gray and garbage components (i.e., the model components) at S415. The joint segmentation and AWB circuit 1205 may divide the pixels among the components using an expectation step (E-step) of an expectation-maximization algorithm, such as described in Dempster, et al., *Maximum Likelihood from Incomplete Data via the EM Algorithm*, Journal of the Royal Statistical Society, Vol. 39, No. 1, pp. 1-38 (1977), the entire contents of which are hereby incorporated by reference.

As a result, latent (unobserved) variables $Y=\{y_j\}_{j=1}^{\#pixels}$ are introduced, where each $y_j$ associates the j-th pixel to one of the model components (hue components, close-to gray component and garbage component).

The division performed by the joint segmentation and AWB circuit 1205 may be performed using a hard way or soft way. In the hard way of modeling, the joint segmentation and AWB circuit 1205 determines $y_j$ to have a value from 1 to K+2 (K hue components, the close-to-gray component and the garbage component). The value of $y_j$ is the number 1 to K+2 corresponding to the component associated with the highest likelihood. In the soft modeling, the joint segmentation and AWB circuit 1205 determines $y_j$ to be a vector of likelihoods with respect to all the model components.

As a result, incomplete and complete log-likelihoods are determined using the EM method.

At S420, the joint segmentation and AWB circuit 1205 optimizes the model parameters. More specifically, the joint segmentation and AWB circuit 1205 determines the red and blue channels gains (red and blue pixels) Gr and Gb, respectively, a Chroma error for each hue and a standard deviation of the close to gray component that maximizes the expected log-likelihoods using the M-step of the expectation-maximization algorithm.

At S425, the white balance circuit determines whether the model parameters have converged. The convergence is determined by examining the change of the complete likelihood that occurs between two subsequent iterations of the EM. If that change was small enough, i.e. it was less than a threshold, which is a tuning parameter of the method, the optimization is converged. Alternatively, the optimization is stopped, if the number of iterations reached its maximum, which is also a tuning parameter.

If the model parameters have not converged, the method returns to S410 using the model parameters previously determined at S420.

If the model parameters have converged at S430, the converged model parameters are the white balance values $WB_{JS}$. In other words, the converged model parameters may be referred to the white balance values $WB_{JS}$. The white balance values $WB_{JS}$ are output to the joint WB and confidence computation circuit 1220.

The joint WB and confidence computation circuit 1220 uses the outputs from the joint segmentation and AWB circuit 1205, the WB computation circuit 1210 and the UTP computation circuit 1215 as will be described in greater detail below.

Figure 5:
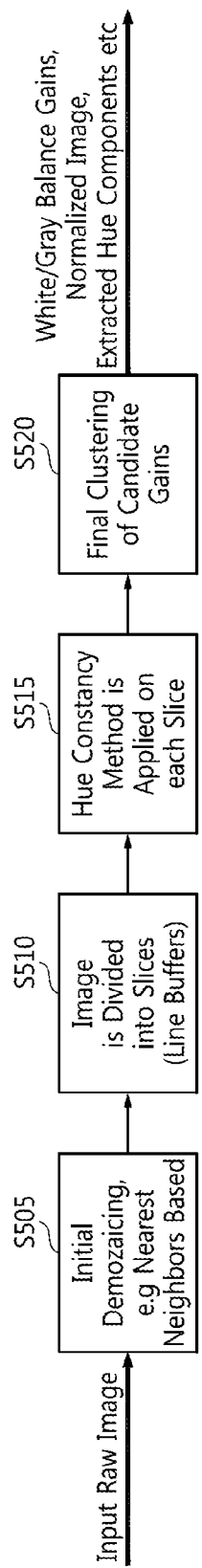
FIG. 5 illustrates a method of determining gains for channels of an image according to an example embodiment.

FIG. 5 illustrates a hardware flowchart of the method of determining gains for channels of an image according to an example embodiment, as described in FIGS. 3A-4.

As shown in FIG. 5, the input image is subjected to demozaicing using a known algorithm such as a nearest neighbors based algorithm at S505. At S510, the image is divided into slices. At S515, the method of FIG. 4 is then applied to each slice. At S520, the resulting gains from S515 are clustered. For example, the resulting gains may be clustered using a mean shift algorithm.

Referring back to FIG. 2, the white balance circuit 1200 includes the UTP computation circuit 1215, the WB computation circuit 1210 and the joint segmentation and AWB circuit 1205.

The UTP computation circuit 1215 extracts a color histogram for the input image and calculates a UTP value for the red and blue channels.

A conventional method for recognizing gray reflecting surfaces in an image is to apply a known illumination detection method and then look for large surfaces with a color similar to the detected illumination color. However, some images have large non-gray reflecting surfaces and the color of these surfaces may be similar enough to the detected illumination color. This is even more severe in scenes where the detected illumination was wrong to begin with, making the error even greater.

As a result, the inventors have developed a method to validate the illumination color and employ the gray surface detection method when a confidence of the illumination is above a threshold.

The example embodiment described below discloses a ratio between the red and blue light intensities. However, example embodiments are not limited thereto and ratios between the red or the blue light intensity and that of the green light, thus receiving the full red (R), green (G), and blue (B) ratios, may be determined.

Figure 6:
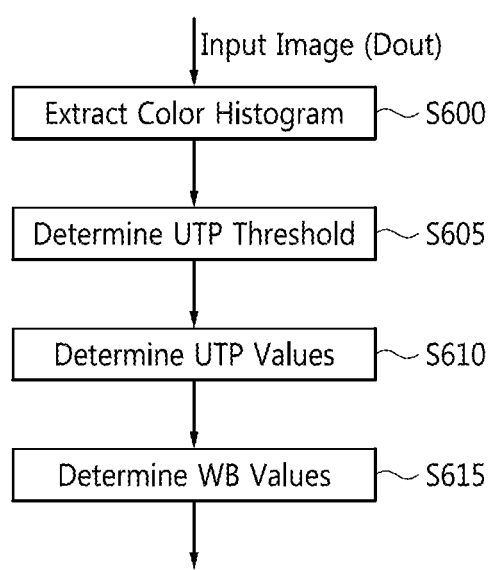
FIG. 6 illustrates a method of determining a UTP value according to an example embodiment.

FIG. 6 illustrates a method of determining UTP values according to an example embodiment.

At S600, the UTP computation circuit 1215 extracts a color histogram from the input image $D_{OUT}$. At S605, the UTP computation circuit 1215 determines a UTP threshold based on the color histogram. The UTP computation circuit 1215 determines a second percentile of pixels of both the blue and red channels. The UTP computation circuit 1215 defines the higher value between the two second percentiles as the UTP threshold. At S610, the UTP computation circuit 1215 then determines the UTP value for each channel based on the UTP threshold. More specifically, the UTP computation circuit 1215 determines the percentile for each of the blue and red channels at/or below the UTP threshold and defines the percentiles as the UTP value. Thus, one UTP value will be two and the other will be two or higher.

The inventors have discovered that the log of the ratio between the UTP values correlates with a ratio between blue and red light intensities. Thus:

$$0.27 * \ln\left(\frac{UTP(r)}{UTP(b)}\right) + 1.2 \sim \frac{whitePoint(b)}{whitePoint(r)} \quad (7)$$

where whitepoint(b) is the white point value for the blue channel and whitepoint(r) is the white point value for the red channel.

The UTP computation circuit 1215 determines the UTP values for red UTP(r) and the UTP values for blue UTP(b) using any known method. The UTP computation circuit 1215 then uses equation (7) to determine the ratio between normalized white balance values whitePoint(b) and whitePoint(r).

At S615, the UTP computation circuit 1215 determines the white balance values $WB_{UTP}$. More specifically, the UTP computation circuit 1215 then determines the normalized white balance values white point whitePoint(b) and a white point corresponding to green whitePoint(g) as follows:

$$\frac{whitePoint(b)}{whitePoint(r)} = k \quad (8)$$

$$\frac{whitePoint(g)}{whitePoint(r)} = j \quad (9)$$

Using equations (8) and (9), the UTP computation circuit 1215 determines a relationship of the white points as:

$$whitePoint(b) + whitePoint(g) = (k+j) * whitePoint(r) \quad (10)$$

Thus, $$whitePoint(b) + whitePoint(g) + whitePoint(r) = (k+j+1) * whitePoint(r) \quad (11)$$

Since $$whitePoint(b) + whitePoint(g) + whitePoint(r) = 1 \quad (12)$$

Then, $$1 = (k+j+1) * whitePoint(r) \quad (13)$$

$$whitePoint(r) = 1/(K+j+1) \quad (14)$$

Therefore, the UTP computation circuit 1215 determines the normalized white balance values whitePoint(b) and whitePoint(g) as follows:

$$whitePoint(b) = k/(K+j+1) \quad (15)$$

$$whitePoint(g) = j/(K+j+1) \quad (16)$$

The normalized white balance values whitePoint(b), whitePoint(g) and whitepoint(r) constitute the WB values $WB_{UTP}$ that are sent from the UTP Computation circuit 1215 to the joint WB and confidence computation circuit 1220.

The joint WB and confidence computation circuit 1220 takes the white balance values for WB computation from the joint segmentation and AWB circuit 1205 ($WB_{JS}$), the WB computation circuit 1210 ($WB_{CC}$) and UTP computation circuit 1215 ($WB_{UTP}$) and mixes them into a single result, this mix can be either be a simple average or a smarter weighted averaging. Each of the white balance values $WB_{JS}$, $WB_{CC}$ and $WB_{UTP}$ forms a white point (red, blue and green values for a white point).

The joint WB and confidence computation circuit 1220 determines how to combine the WB data $WB_{JS}$, $WB_{CC}$ and $WB_{UTP}$ into a result with a highest possible confidence.

For each of the 3 white points from the white balance values $WB_{UTP}$, $WB_{CC}$ and $WB_{JS}$, the joint WB and confidence computation circuit 1220 determines a Euclidean distance over the Rn,Bn space to the nearest other point (nearesNeighborDist).

The joint WB and confidence computation circuit 1220 assigns a weight to each of the three white points. The joint WB and confidence computation circuit 1220 determines the weight as 1/(nearesNeighborDist+1).

The joint WB and confidence computation circuit 1220 generates a mixed value $WB_{JOINT}$ by determining a weighted average of the 3 white points using the determined weights.

The joint WB and confidence computation circuit 1220 determines a confidence CONF of the mixed value $WB_{JOINT}$ by averaging the equation (1/(distanceToMergedPoint+1)) over the three white points, where distanceToMergedPoint is the distance between the white point and the mixed value $WB_{JOINT}$. Thus, the joint WB and confidence computation circuit 1220 determines a result of (1/(distanceToMergedPoint+1)) three times (one for each white point) and averages the three results.

The joint WB and confidence computation circuit 1220 outputs the mixed value $WB_{JOINT}$ to the gray surface recognition circuit 1230 and the selector 1235. The joint WB and confidence computation circuit 1220 outputs the confidence CONF to the selector 1235.

The gray surface recognition circuit 1230 receives the mixed value $WB_{JOINT}$ and replaces the mixed value $WB_{JOINT}$ with the color of a gray wall $WB_{GRAY}$. More specifically, the gray surface recognition circuit 1230 compares the mixed value $WB_{JOINT}$ to at least one surface (e.g., an area covering more than a threshold number of pixels) whose color is close to the mixed value $WB_{JOINT}$ (i.e., "close-to-gray pixels"). If the mixed value $WB_{JOINT}$ and the color of the at least one surface is within a threshold difference, the gray surface recognition circuit 1230 averages the color of the pixels in the surface and replaces the mixed value $WB_{JOINT}$ with the averaged value as a white point $WB_{GRAY}$.

The selector 1235 selects the output from the joint WB and confidence computation circuit 1220 or the gray surface recognition circuit 1230 based on the confidence. If the confidence CONF is equal to or higher than a threshold confidence value, the selector 1235 selects the color of the gray wall $WB_{GRAY}$ to be used as the white point for the white color $WB_{FINAL}$. The threshold confidence value may be set by a user and determined based on empirical data. If cases where gray walls are expected a relatively lower threshold confidence value may be used and in cases to be outdoor (where gray walls are not expected), a relatively higher threshold confidence value may be used. If the confidence CONF is lower than the threshold confidence value, the selector 1235 selects the mixed value $WB_{JOINT}$ to be used for white balancing, $WB_{FINAL}$.

The white balance image generator 1240 generates an image $Image_{WB}$ using the white point $WB_{FINAL}$ using conventional methods of applying gains to the image data $D_{OUT}$.

The UTP illumination detection method described herein may be used in combination with other illumination detection techniques to create an improved illumination detector.

Figure 7:
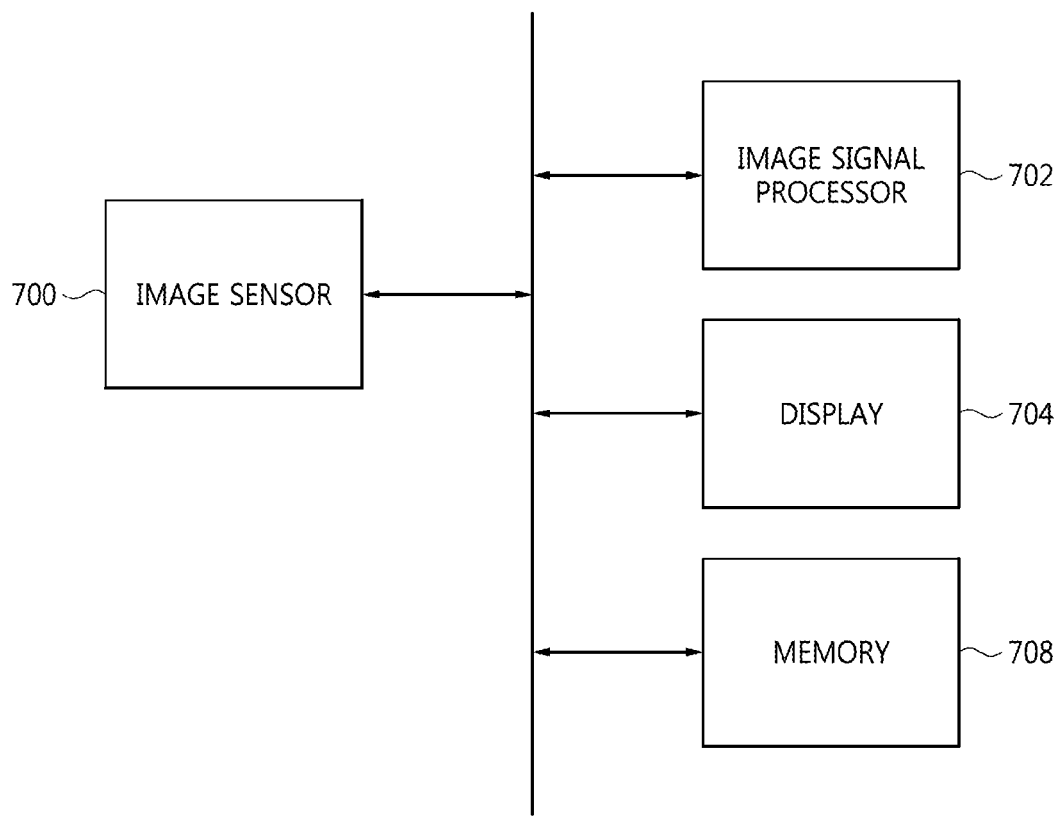
FIG. 7 is a block diagram illustrating an electronic imaging system according to an example embodiment.

FIG. 7 is a block diagram illustrating an electronic imaging system according to an example embodiment.

Referring to FIG. 7, the electronic imaging system includes: an image sensor 700; an image signal processor (ISP) 702; a display 704; and a memory 708. The image sensor 700, the ISP 702, the display 704 and the memory 708 communicate with one another via a bus 706.

The image sensor 700 may be an image sensor according to example embodiments described herein. The image sensor 700 is configured to capture image data by converting optical images into electrical signals. The electrical signals are output to the ISP 702.

The ISP 702 processes the captured image data for storage in the memory 708 and/or display by the display 704. In more detail, the ISP 702 is configured to: receive digital image data from the image sensor 700; perform image processing operations on the digital image data; and output a processed image or processed image data. The ISP 702 may be or include the image processing circuit 108 shown in FIG. 1.

The ISP 702 may also be configured to execute a program and control the electronic imaging system. The program code to be executed by the ISP 702 may be stored in the memory 708. The memory 708 may also store the image data and/or images acquired by the image sensor and processed by the ISP 702. The memory 708 may be any suitable volatile or non-volatile memory.

The memory 708 may be a two-dimensional (2D) or three dimensional (3D) memory array. A 3D memory array is monolithically formed in physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

The 3D memory array includes vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Patent Application Publication No. 2011/0233648.

The electronic imaging system shown in FIG. 7 may be connected to an external device (e.g., a personal computer or a network) through an input/output device (not shown) and may exchange data with the external device.

The electronic imaging system shown in FIG. 7 may embody various electronic control systems including an image sensor, such as a digital still camera. Moreover, the electronic imaging system may be used in, for example, mobile phones, personal digital assistants (PDAs), laptop computers, netbooks, MP3 players, navigation devices, household appliances, or any other device utilizing an image sensor or similar device.

The foregoing description of example embodiments has been provided for purposes of illustration and description. It is not intended to be exhaustive or limiting. Individual elements or features of a particular example embodiment are generally not limited to that particular example embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. An apparatus comprising:
a processor configured to execute computer-readable instructions to,
receive image data from a plurality of pixels;
determine a first white point based on the image data and a threshold percentage of a histogram of the image data;
determine a second white point based on the image data;
determine a third white point based on groups of the image data corresponding to a same hue of a plurality of hues or desaturation, the processor configured to divide the image data into the groups; and
generate an image based on at least the first white point, the second white point and the third white point.

2. The apparatus of claim 1, wherein the processor is configured to,
determine likelihoods of the pixels being one of the hues;
divide the pixels into the groups based on the likelihoods;
determine processing gains based on the groups and likelihoods; and
generate the third white point based on the processing gains.

3. The apparatus of claim 2, wherein the processor is configured to determine the processing gains using an iterative process.

4. The apparatus of claim 2, wherein the processor is configured to determine at least one desaturated pixel of the image and associate the desaturated pixel with a color of gray.

5. The apparatus of claim 4, wherein the processor is further configured to,
mix the first white point, the second white point and the third white point to generate a mixed value;
determine a confidence value of the mixed value; and
generate the image using the color of gray for white balancing if the confidence value is greater than or equal to a threshold.

6. The apparatus of claim 5, wherein the processor is configured to generate the image using the mixed value for white balancing if the confidence value is below the threshold.

7. The apparatus of claim 1, wherein the processor is further configured to,
mix the first white point, the second white point and the third white point to generate a mixed value;
determine a confidence value of the mixed value; and
generate the image based on the confidence value.

8. The apparatus of claim 7, wherein the processor is further configured to generate the image using a color of gray for white balancing if the confidence value is greater than or equal to a threshold.

9. The apparatus of claim 8, wherein the processor is configured to generate the image using the mixed value for white balancing if the confidence value is below the threshold.

10. The apparatus of claim 1, wherein the groups correspond to object surfaces having homogenous reflection properties.

11. A method comprising:
receiving image data from a plurality of pixels;
determining a first white point based on the image data and a threshold percentage of a histogram of the image data;
determining a second white point based on the image data;
determining a third white point based on groups of the image data corresponding to a same hue or desaturation, a processor configured to divide the image data into the groups; and
generating an image based on at least the first white point, the second white point and the third white point.

12. The method of claim 11, wherein the determining the third white point includes,
determining likelihoods of the pixels being one of the hues;
dividing the pixels into the groups based on the likelihoods;
determining processing gains based on the groups and likelihoods; and
generating the third white point based on the processing gains.

13. The method of claim 12, wherein the determining the processing gains uses an iterative process.

14. The method of claim 12, further comprising:
determining at least one desaturated pixel of the image and associate the desaturated pixel with a color of gray.

15. The method of claim 14, wherein the generating the image based on at least the first white point, the second white point and the third white point includes,
mixing the first white point, the second white point and the third white point to generate a mixed value;
determining a confidence value of the mixed value; and
generating the image using the color of gray for white balancing if the confidence value is greater than or equal to a threshold.

16. The method of claim 15, wherein the generating the image based on at least the first white point, the second white point and the third white point uses the mixed value for white balancing if the confidence value is below the threshold.

17. The method of claim 11, wherein the generating the image based on at least the first white point, the second white point and the third white point includes,
mixing the first white point, the second white point and the third white point to generate a mixed value;
determining a confidence value of the mixed value; and
generating the image based on the confidence value.

18. The method of claim 17, wherein the generating the image based on at least the first white point, the second white point and the third white point uses a color of gray for white balancing if the confidence value is greater than or equal to a threshold.

19. The method of claim 18, wherein the generating the image based on at least the first white point, the second white point and the third white point uses the mixed value for white balancing if the confidence value is below the threshold.

20. The method of claim 11, wherein the groups correspond to object surfaces having homogenous reflection properties.

* * * * *